(12) United States Patent
Heyne et al.

(10) Patent No.: US 8,345,718 B2
(45) Date of Patent: Jan. 1, 2013

(54) PULSE SHAPER AND LASER WITH PULSE SHAPER

(75) Inventors: Karsten Heyne, Grossbeeren (DE); Mathias Hartmann, Berlin (DE); Klaus Molkenthin, Berlin (DE)

(73) Assignee: Freie Universitaet Berlin, Berlin (DE)

( * ) Notice: Subject to any disclaimer, the term of this patent is extended or adjusted under 35 U.S.C. 154(b) by 48 days.

(21) Appl. No.: 12/991,375

(22) PCT Filed: May 6, 2009

(86) PCT No.: PCT/EP2009/055465
§ 371 (c)(1),
(2), (4) Date: Apr. 25, 2011

(87) PCT Pub. No.: WO2009/135870
PCT Pub. Date: Nov. 12, 2009

(65) Prior Publication Data
US 2011/0255563 A1     Oct. 20, 2011

(30) Foreign Application Priority Data
May 6, 2008   (DE) .......................... 10 2008 022 724

(51) Int. Cl.
*H01S 3/10*     (2006.01)
(52) U.S. Cl. ............... 372/25; 372/20; 372/30; 372/100
(58) Field of Classification Search .................. 372/20, 372/25, 30
See application file for complete search history.

(56) References Cited

U.S. PATENT DOCUMENTS

| 3,720,884 A | * | 3/1973 | Kelley et al. ..................... 372/25 |
| 5,233,182 A | * | 8/1993 | Szabo et al. ............ 250/214 VT |
| 5,513,194 A | | 4/1996 | Tamura et al. |

(Continued)

FOREIGN PATENT DOCUMENTS

DE     197 33 193     2/1999

(Continued)

OTHER PUBLICATIONS

Martinez O E et al, Negative Group-Velocity Dispersion Using Refraction, Journal of the Optical Society of America A, Optical Society of America, US, vol. 1, No. 10, Oct. 1, 1984, pp. 1003-1006.

(Continued)

*Primary Examiner* — Dung Nguyen
(74) *Attorney, Agent, or Firm* — Maschoff Gilmore & Israelsen

(57) ABSTRACT

A pulse shaper for compensating group runtime effects is provided. The pulse shaper comprising a first and a second dispersive element. An optical pulse can be coupled to the pulse shaper along a coupling direction such that said pulse exits from the pulse shaper after passing through the first and the second dispersive element along an exit direction. The first and the second dispersive element are formed and arranged to be movable relative to each other such that the path length to be traversed by the optical pulse through the first and the second dispersive element after coupling to the pulse shaper can be adjusted without any change in an offset between the coupling direction and the exit direction. The first and the second dispersive element are arranged in such a way that the shape of the optical pulse experiences a change as the pulse travels through the pulse shaper.

20 Claims, 6 Drawing Sheets

U.S. PATENT DOCUMENTS

| | | | |
|---|---|---|---|
| 5,526,171 A | | 6/1996 | Warren |
| 5,579,152 A | | 11/1996 | Ellingson |
| 6,025,911 A | * | 2/2000 | Diddams et al. .............. 356/450 |
| 2002/0024015 A1 | | 2/2002 | Hoffmann et al. |
| 2007/0086493 A1 | | 4/2007 | Apolonski |

FOREIGN PATENT DOCUMENTS

| | | |
|---|---|---|
| EP | 1 237 308 A | 9/2002 |
| WO | 94/26008 | 11/1994 |
| WO | 2005/048419 A1 | 5/2005 |
| WO | 2005048419 A1 | 5/2005 |

OTHER PUBLICATIONS

Lemoff B E et al, Cubic-Phase-Free Dispersion Compensation in Solid-State Ultrashort-Pulse Lasers, Optics Letters, Osa, Optical Society of America, Washington, DC, US, vol. 18, No. 1, Jan. 1, 1993, pp. 57-59.

Fecko C J et al, Generation of 45 Femtosecond Pulses at 3 Mum with a KNb03 Optical Parametric Amplifier, Optics Communications, North-Holland Publishing Co. Amsterdam, NL, vol. 241, No. 4-6, Nov. 16, 2004, pp. 521-528.

* cited by examiner

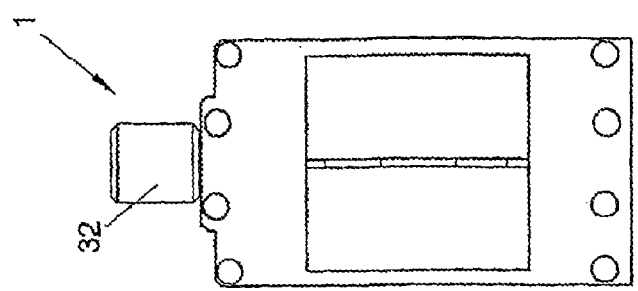
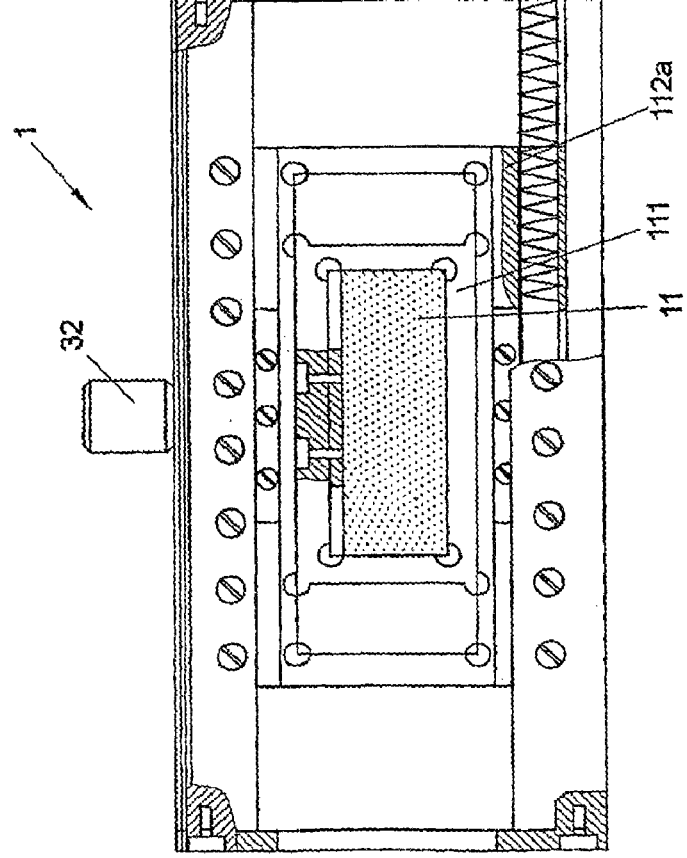
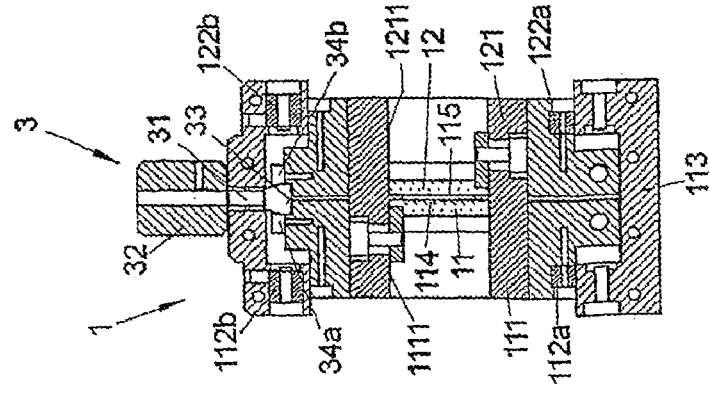

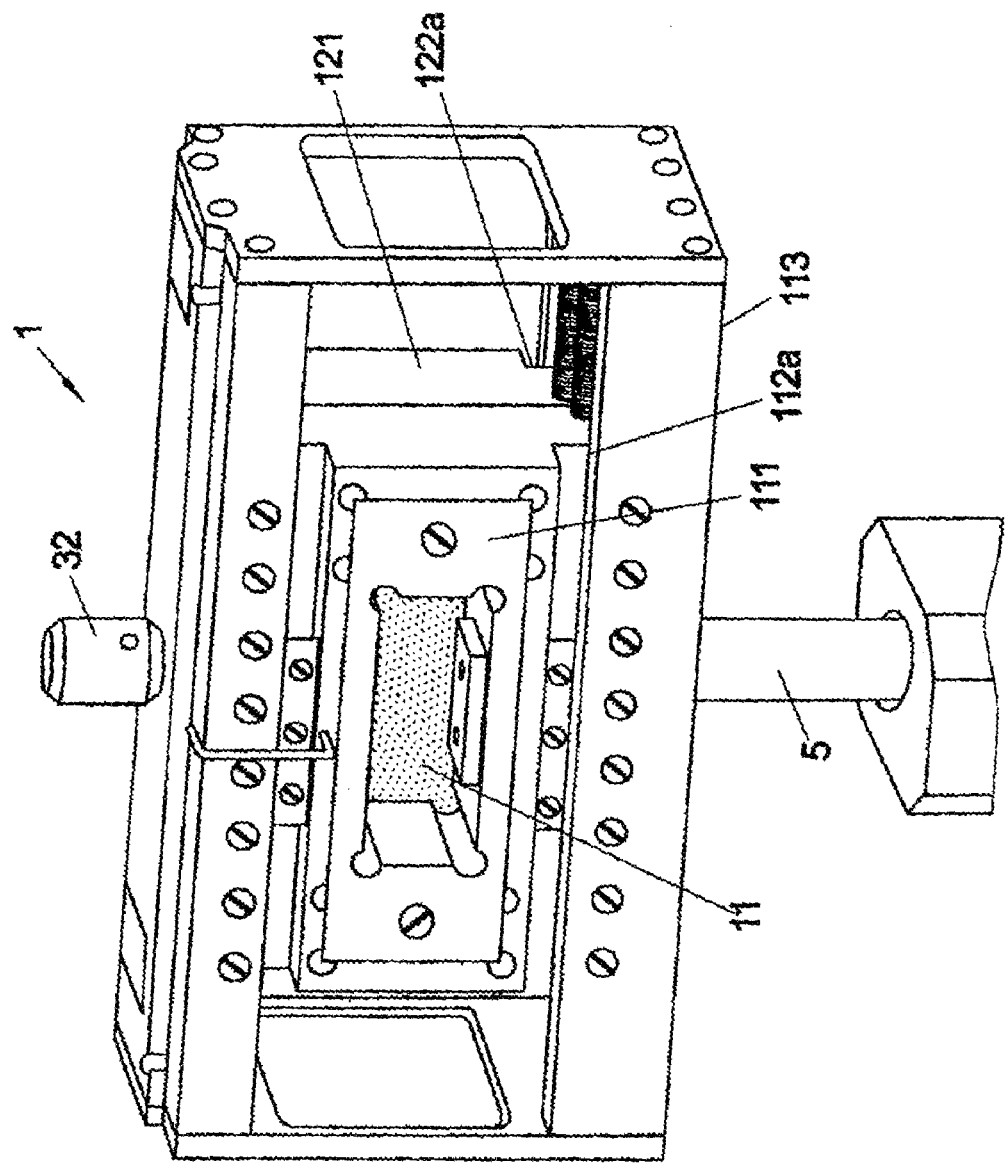

PULSE SHAPER AND LASER WITH PULSE SHAPER

CROSS-REFERENCE TO A RELATED APPLICATION

This application is a National Phase Patent Application of International Patent Application Number PCT/EP2009/055465, filed on May 6, 2009, which claims priority of German Patent Application Number 10 2008 022 724.2, filed on May 6, 2008.

BACKGROUND

The present invention relates to a pulse shaper and in particular also to a laser with such pulse shaper.

The use of a pulse shaper typically is provided for ultrashort light pulses with a wide frequency spectrum. The objective of a pulse shaper is to manipulate individual spectral components of the light pulse with respect to the others in a temporal, spatial or polarization-dependent manner.

There are known devices which allow to influence wavelengths separately (e.g. LCD mask, AOM). The majority of pulse shapers utilizes a dispersive optical element by means of which the wavelengths are split up and thus made accessible. This involves the disadvantage that the total energy of the light pulse is reduced by reflection losses at the dispersive optical element.

Due to the dispersive splitting of the wavelengths in different directions in space, a temporal shaping and compression of the light pulse can be effected along different travel paths for different wavelengths. This will necessarily result in a change of the beam direction. Moreover, the beam path required in addition for shaping the light pulse is long and typically lies in the visible spectral range between 30 and 300 cm. In the near infrared and middle infrared spectral range, this length even increases. This has a negative influence on the stability of an optical assembly, since the pointing error increases with a longer beam path.

Furthermore, it is difficult in the middle infrared spectral range (between 2500 and 30000 mm) to adjust pulse shapers in the resonator of an IR laser, since the dispersed light beam cannot be made visible. As a result and due to the fact that the optical materials in part are not transparent for visible light in the infrared spectral range, pulse shapers are hardly used in the middle infrared spectral range.

An alternative is the use of an AOM (acousto-optical modulator), which provides for shaping amplitude and phase of the infrared light pulse. However, there are limitations for the diameter of the light beam and for the intensity, which can be very high in ultrashort pulses. In addition, AOMs are very expensive.

Furthermore, it is known from C. J. Fecko et al., Optics Communications, 241 (2004), 521-528, to shape the infrared light pulse in the middle infrared spectral range in a simple manner by means of plane-parallel plates of different materials. Here, the GVD (group velocity dispersion) of different materials in the infrared spectral range is utilized to impart an (almost) linear positive or negative chirp to the light pulse.

Disadvantageously, the plane-parallel plates cannot continuously be varied in their optical thickness in a simple manner, without the beam direction being changed (e.g. when tilting the plates). Another disadvantage consists in that materials which are transparent in the middle infrared spectral range regularly have a high refractive index for this spectral range, so that even when tilting a plane-parallel plate, the light beam would be refracted with respect to the perpendicular to such an extent that the change in length of the optical path would only be insufficient. The resulting necessary thicknesses and/or tilt angles on the one hand would lead to an undesirably high absorption inside the plate and on the other hand to an undesirably high reflection due to the resulting angles of incidence.

In addition, the use of a plurality of plane-parallel plates involves higher reflection losses, which reduces the total intensity of the light pulse.

SUMMARY

Therefore, it is the object of the present invention to provide a pulse shaper for light pulses—in particular for light pulses in the middle infrared spectral range—, which can be manufactured at low cost and in addition is easily adjustable. Furthermore, the pulse shaper of the invention should have a low susceptibility to failure and do without active assemblies such as in an AOM, for example.

Another object of the invention consists in providing a laser for ultra-short light pulses, which realizes a broad-band compensation of group runtime effects with a comparatively inexpensive and compact construction.

According to an exemplary embodiment of the invention, a pulse shaper is provided, comprising
a first and a second dispersive element, wherein
an optical pulse can be coupled to the pulse shaper along a coupling direction such that said pulse exits from the pulse shaper after passing through the first and the second dispersive element along an exit direction, and
the first and the second dispersive element are formed and arranged to be movable relative to each other such that the path length to be traversed by the optical pulse through the first and the second dispersive element after coupling to the pulse shaper can be adjusted without any change in a displacement between the coupling direction and the exit direction (which is due to the dispersion properties of the first and the second dispersive element).

In addition, the first and the second dispersive element are arranged in such a way that the shape of the optical pulse experiences a change as the pulse travels through the pulse shaper, which primarily or exclusively is caused by the group velocity dispersion occurring during passage through the first and/or the second dispersive element.

Thus, the pulse shaper of the invention does not shape the optical pulse in that it generates different travel paths for different wavelength components of the pulse, but in that the materials of the two dispersive elements have such dispersion properties that the pulse shape substantially is changed solely by the group velocity dispersion during passage of the pulse through the dispersive elements. Passage through the space between the dispersive elements plays no role or only a subordinate role for the change of the pulse shape. The fact that the change of the pulse shape "primarily" is due to the group velocity dispersion means for example that at least half of the change of the temporal half width of the pulse is caused by the group velocity dispersion during passage through the first and/or second dispersive element and correspondingly less than half (of the amount) of the change of the half width is caused by runtime effects.

As to the technical term "group velocity dispersion" the following is noted: The dispersion properties (i.e. the wavelength dependence of the refractive index) of a material generally lead to the fact that not only the phase velocity of an optical wave, but also its group velocity (i.e. the velocity with which an amplitude envelope of the wave is moving) is wavelength-dependent. The wavelength dependence of the group velocity during passage through a dispersive material is referred to as group velocity dispersion (GVD). The GVD in particular can have the effect that the shape (i.e. the course of the amplitude envelope) of an optical pulse changes during passage through a material, e.g. the pulse is temporally broadened.

For characterizing the dispersion properties of a material in particular the parameter D is used, which is obtained from the second derivative of the refractive index profile as follows:

$$D = -\frac{\lambda}{c}\frac{d^2 n}{d\lambda^2}$$

Here, $\lambda$ designates the wavelength of the pulse, n designates the (wavelength-dependent) refractive index of the material, and c designates the velocity of light.

When a material has a dispersion parameter D with a negative sign, this is referred to as positive dispersion which leads to a temporal broadening of a pulse traveling through the material. With a positive sign of D, reference correspondingly is made to negative dispersion.

In particular, a negatively dispersive material (e.g. ZnSe for wavelengths in the infrared range or oxides such as MgO and metamaterials in the visible or ultraviolet spectral range) can be chosen for the first and the second material of the first and/or the second dispersive element, in order to compensate a pulse broadening as a result of a positive group velocity dispersion of an optical assembly through which the pulse travels or should travel, i.e. in order to generate a pulse compression. For example, the first and the second material are identical, wherein the degree of pulse compression (or also pulse broadening) is adjusted by adaptation of the optical path which the pulse must travel through the two dispersive elements by means of shifting the dispersive elements relative to each other.

The first and the second material can also be positively dispersive, in order to be able to compensate a negative group velocity dispersion. Moreover, it is also conceivable that the first and the second material have opposite dispersion properties, i.e. the first material is a negatively dispersive material and the second material is a positively dispersive material. Depending on the position of the two dispersive elements with respect to each other and relative to the light pulse coupled to the pulse shaper, this provides for compensating both a negative and also a positive group velocity dispersion.

In one exemplary variant of the invention two pairs of dispersive elements are used, wherein the one pair includes e.g. dispersive elements with a negatively dispersive material and the other pair includes dispersive elements with a positively dispersive material. This provides for a particularly efficient compensation of both a negative and a positive group velocity dispersion. This aspect of the invention will be discussed below.

Beside the compression of light pulses in the near infrared spectral range, one possible use of the pulse shaper of the invention also is the compression of light pulses e.g. in the visible spectral range. A use in the visible range in particular requires materials which have a negative GVD in this spectral range. This is the case for some oxides such as MgO and for metamaterials. Hence, the pulse shaper of the invention can also be used in optical parametric oscillators (OPO), optical parametric amplifiers (OPA) and non-collinear optical parametric amplifiers (NOPA). A further use is the prechirping of seed light. e.g. in OPAs or NOPAs in the visible, near infrared and middle infrared spectral range.

It should be noted that the first and/or the second dispersive element need not necessarily comprise a solid material. For example, it is also possible that the first and/or the second dispersive element include a container which contains an (in particular negatively) dispersive liquid (or a gas).

It should further be mentioned that during passage of the pulse through the first and/or the second dispersive element a certain spatial splitting of different wavelength components of the pulse, i.e. different travel paths of the wavelength components, can occur. However, these slightly different travel paths of the wavelength components only have a small and in particular only a negligeable effect on the change of the pulse shape. In one embodiment of the invention, the two dispersive elements are arranged relative to each other such that the spatial splitting of the wavelength components is not greater than the spatial expansion of the pulse, i.e. does not exceed the diameter of the pulse.

In particular, two wavelength components of the pulse are considered, of which the one component has a wavelength which is obtained by reducing the central wavelength of the pulse by half the spectral half width of the pulse, and the other component has a wavelength which is obtained by increasing the central wavelength of the pulse by half the spectral half width. In accordance with this variant of the invention, the spatial distance of these two wavelength components after passing through the first and the second dispersive element is not greater than the diameter of the light pulse.

In another exemplary variant of the invention, the first and the second dispersive element each are formed in the shape of a wedge. For example, the two wedges of the pulse shaper are arranged with side faces facing each other in parallel, so that the distance between the wedges is constant. However, it is also conceivable in principle that the side faces of the wedges facing each other extend at an angle to each other.

In one exemplary variant of the invention, the greatest distance between the two dispersive elements (i.e. in particular between side faces of the dispersive elements facing each other) is not more than 20 cm, in particular not more than 10 cm, not more than 30 mm, not more than 15 mm or not more than 1.5 mm, wherein the additional optical path during passage through the dispersive elements in particular does not exceed 7 cm. In addition, the dispersive elements can be arranged relative to each other such that they cause a parallel offset between coupling direction and exit direction of the light pulse of not more than 1.5 mm (e.g. when using germanium). When forming the dispersive elements in the shape of a wedge, the wedge angles in particular are about 7°.

In accordance with another aspect of the invention, the pulse shaper in particular includes a first and a second dispersive element each with two planar side faces, which converge at an acute angle. For example, the first and/or the second dispersive element includes a material with an absorption of less than 10% per cm for electromagnetic radiation in the visible or in the middle infrared spectral range. In addition, the dispersive elements can be wedge-shaped and arranged relative to each other such that the tips of the wedges point in opposite directions and side faces of the wedges facing each other are at least partly disposed opposite each other.

In accordance with the development of the invention already mentioned above, the pulse shaper includes a first pair of dispersive elements (formed by the first and the second dispersive element) or a second pair of dispersive elements, wherein e.g. the optical dispersion (the dispersion properties) of the material of the dispersive elements of a pair each is the same and the optical dispersion of the material of the dispersive elements of the first pair can differ from the optical dispersion of the dispersive elements of the second pair. In particular, the dispersive elements can be designed wedge-shaped and be arranged relative to each other such that the tips of the wedges of a wedge pair each point in opposite directions and the side faces of the wedges of a wedge pair facing each other at least partly overlap each other.

Preferably, the dispersive elements are made of a material with an absorption of less than 10% per cm (more preferably less than 5% per cm and even more preferably less than 1% per cm) for electromagnetic radiation in the visible or in the middle infrared spectral range (2500-30000 nm). It is requested that the material has said absorption properties preferably over a range of at least 50 wave numbers, more preferably at least 500 wave numbers and even more preferably at least 1000 wave numbers. When using the pulse shaper in a laser, said range should be understood as a range around the central wavelength.

For example, energy losses during passage through the pulse shaper generally can lie below 15% and in particular the direction of the beam path cannot change due to the use of the passive pulse shaper. For this purpose, e.g. two wedge-shaped plates are used, whose wedge tips point in opposite directions and at the same time are shifted towards each other or away from each other. With two pairs of dispersive elements (in accordance with a further design variant), the beam path remains unchanged or almost unchanged. The materials which can be used preferably include: sapphire, ZnSe, ZnS, Ge, Si, $CaF_2$, $BaF_2$, LiF, MgF, KRS-5, GaAs, KBr, KCl, NaCl, $TiO_2$, CdTe, AMTIR (GeAsSe), chalcogenides (AsSeTe), diamond, Irtran, $SiO_2$, MgO and metamaterials.

In accordance with another exemplary aspect of the invention, the first and the second dispersive element are arranged on a common holder and/or in a common frame, i.e. the two dispersive elements form a common unit. The holder or the frame includes e.g. guides in which the two dispersive elements are movably mounted. In particular, guides are provided in the form of linear guides, in which the first and the second dispersive element can be shifted parallel to each other.

In addition, the pulse shaper can include an adjusting device by means of which the first and/or the second element can be shifted. In particular, the adjusting device can be formed such that upon actuation of the adjusting device the first and the second dispersive element are shifted at the same time, but opposite to each other. In particular, it is of course also possible that one of the two dispersive elements is stationary and only the respectively other dispersive element is shifted.

For example, the two dispersive elements each are arranged in or on a carriage, which can be moved via the adjusting device. In particular, the adjusting device includes a drive rod rotatable manually or by motor, which includes a gear rim which cooperates with toothed racks attached to the carriage in the manner of a rack-and-pinion transmission.

The invention is of course not limited to a particular mechanism for moving the two dispersive elements, but transmissions other than the rack-and-pinion transmission described above can also be used, for example.

Preferably, the dispersive elements are mounted to be steplessly displaceable relative to each other (by an amount of at least 5 mm). Preferably, the dispersive elements are mounted such that side faces of the dispersive elements facing each other always are aligned parallel to each other and/or the distance between the side faces of the dispersive elements facing each other is smaller than 5 mm. In wedge-shaped dispersive elements, the wedge angle of both wedges preferably is the same and the wedge angle of the wedges preferably lies between 3° and 20°.

Preferably, at least one side face of the first dispersive element and/or at least one side face of the second dispersive element has an anti-reflection coating for electromagnetic radiation in the middle infrared spectral range. Preferably, the anti-reflection coating is formed such that the intensity of reflections in the middle infrared spectral range on the side face of the dispersive element at an angle of 20° is less than 2%. Preferably, the side faces of the dispersive elements each have a similar anti-reflection coating, but the invention is not limited thereto. By means of anti-reflection coatings, reflection losses per surface can be maintained below 2% (15% loss for 8 surfaces).

Furthermore, it is preferred that said reflection properties of the anti-reflection coating are present over a range of at least 50 wave numbers, more preferably at least 500 wave numbers and even more preferably at least 1000 wave numbers. When using the pulse shaper in an infrared laser, this range refers to the central wavelength.

Preferably a holder is provided, by means of which the dispersive elements each are connected in the region of their rear side. Particularly preferably, the dispersive elements are fixed in the holder such that their side faces facing each other partly are disposed opposite each other in terms of width between 5% and 100%. Furthermore, it is preferred that the dispersive elements are fixed in the holder such that their opposed side faces have an overlap of more than 12 mm in terms of height.

Preferably, the lengths of the side faces of a dispersive element in the form of a wedge differ by less than 10%. Preferably, the lengths of the side faces of the first wedge and the lengths of the side faces of the second wedge differ by less than 10%.

In the case of two pairs of dispersive elements it is preferred that a means for the simultaneous relative displacement of the individual dispersive elements of both pairs each by the same amount is provided. Furthermore, it is preferred that the dispersive elements of a pair are mounted such that side faces facing each other each are aligned parallel to each other and/or the distance between the side faces of the dispersive elements facing each other each is smaller than 5 mm. Furthermore, it is preferred that the dispersive elements of a pair are fixed in the holder such that their side faces facing each other are disposed opposite each other in terms of width between 5% and 100% and/or the dispersive elements of a pair are fixed in the holder such that their side faces disposed opposite each other each have an overlap of more than 12 mm in terms of height.

The invention also comprises a laser, in particular an infrared laser, which includes an active medium and a resonator, wherein a pulse shaper according to at least one of the above-mentioned features is arranged inside the resonator. Preferably, two pairs of dispersive elements are provided and the dispersive elements of both pairs are arranged such that side faces facing the respective other dispersive element of a pair are arranged parallel to a front facet and a rear facet of the resonator (resonator consisting of two resonator surfaces arranged parallel to each other). Preferably, the laser is a pulse laser, particularly preferably for ultrashort pulses.

The invention furthermore relates to an optical parametric oscillator, an optical parametric amplifier or a non-collinear optical parametric amplifier, which contains the pulse shaper of the invention, in order to adjust a specific chirp in the beam path. The beam path is not changed by the pulse shaper of the invention, since no spatial dispersion of the radiation occurs and the entire beam path is shortened. Preferably, the oscillators or amplifiers generate ultrashort light pulses in the middle infrared and near infrared spectral range. By using metamaterials or special oxides (MgO), the use is also possible in the visible and ultraviolet spectral range.

BRIEF DESCRIPTION OF THE DRAWINGS

The invention will be explained below with reference to embodiments shown in detail in the Figures.

FIGS. 6A to 6C show various views of a pulse shaper in accordance with a further embodiment of the invention.

FIG. 7 shows a perspective view of the pulse shaper of FIGS. 6A to 6C.

DETAILED DESCRIPTION

Figure 1:
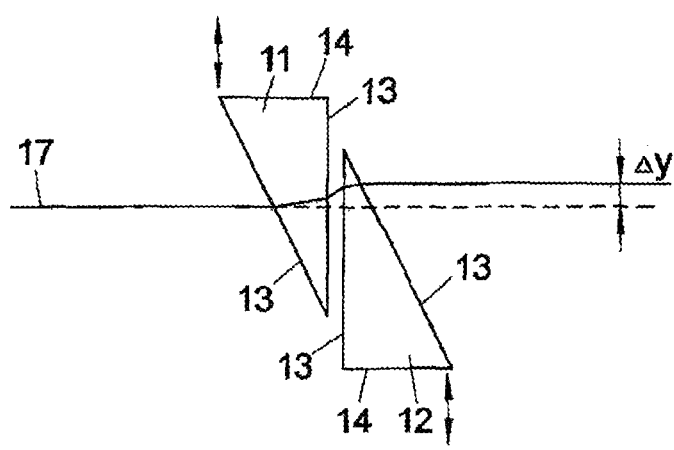
FIG. 1 shows a pulse shaper of the invention for an infrared laser in accordance with a first preferred embodiment in a schematic, sectional representation.

FIG. 1 shows a pulse shaper of the invention for a laser, in particular an infrared laser, in a schematic, sectional representation. The pulse shaper of the invention consists of two oppositely oriented dispersive elements in the form of wedges 11, 12 with different or identical optical dispersion. By shifting the wedges in opposite directions (for example along the inner side faces 13), the (optical) thickness of the wedges 11, 12 can be adjusted differently for an electromagnetic wave 17. On the one hand, it is possible to shift both wedges 11, 12 at the same time or also only one of the two wedges 11, 12.

Figure 3:
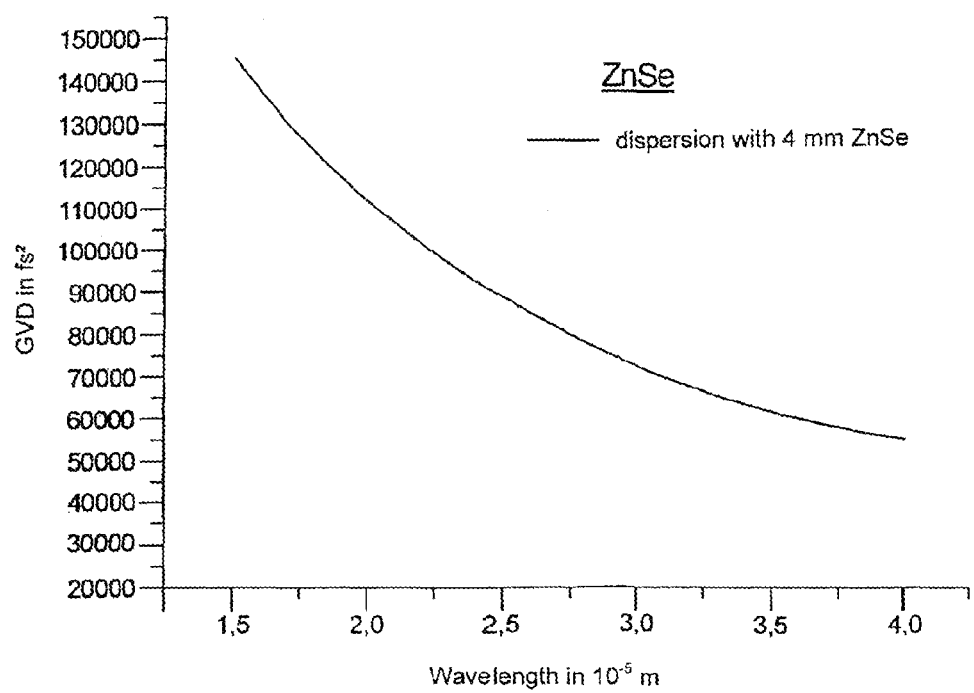
FIG. 3 shows the dispersion of the group velocity ("group velocity dispersion" or also GVD) for a 7° ZnSe wedge with a thickness of 4 mm over a wavelength range from 1.5 µm to 4 µm.
Figure 4:
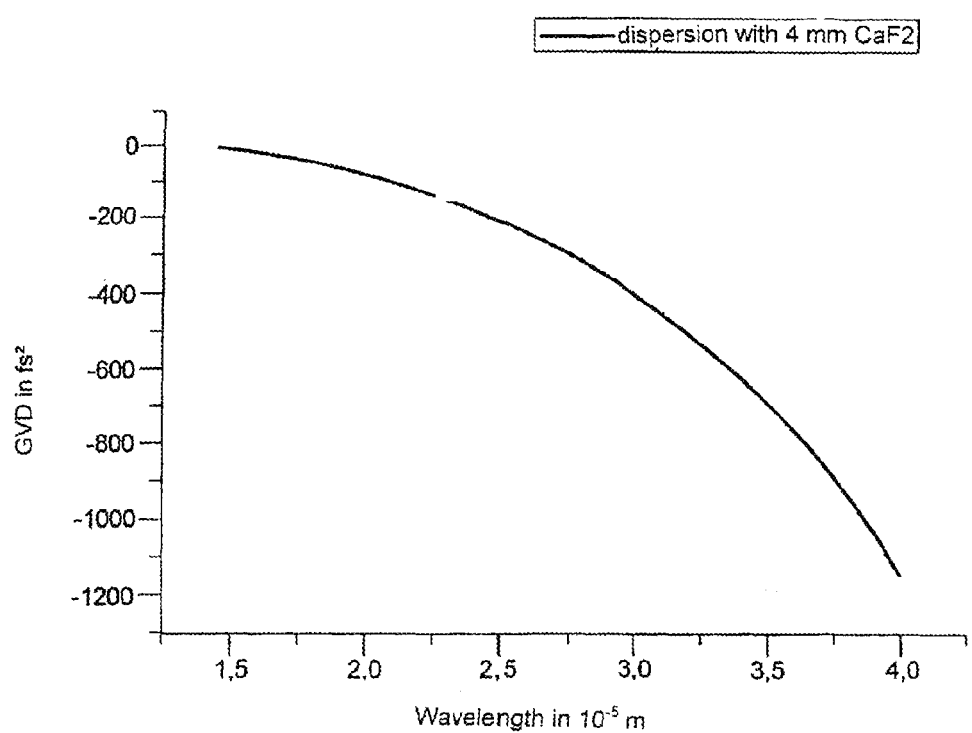
FIG. 4 shows the dispersion of the group velocity for a 7° $CaF_2$ wedge with a thickness of 4 mm over a wavelength range from 1.5 µm to 4 µm.
Figure 5:
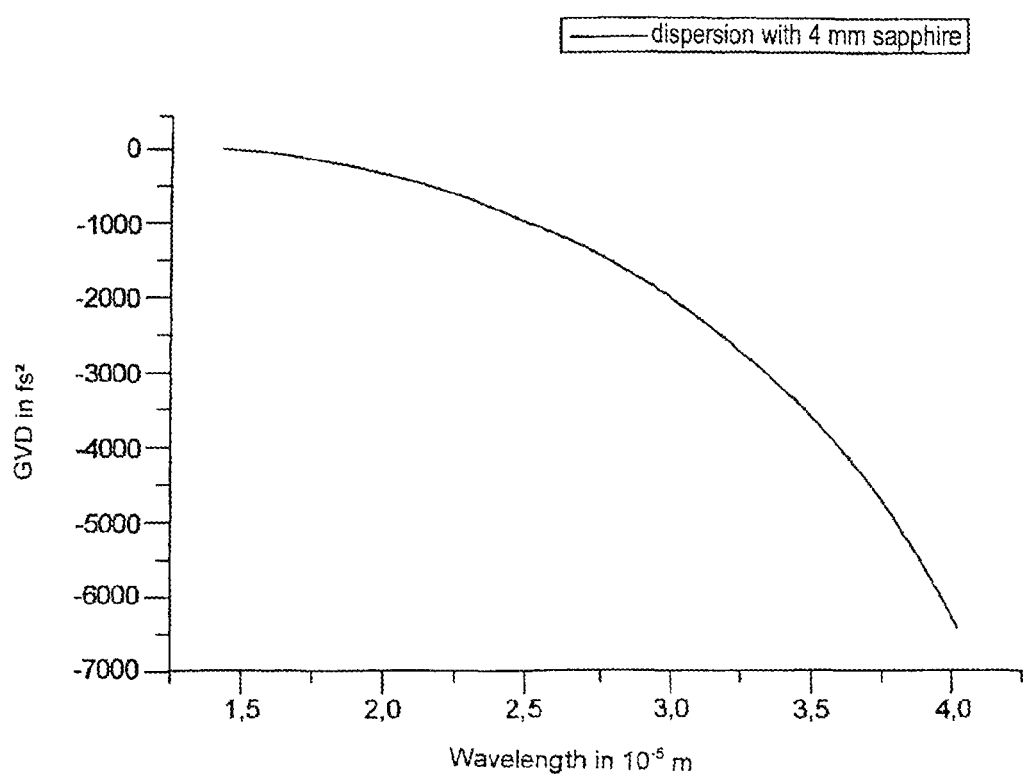
FIG. 5 shows the dispersion of the group velocity for a 7° sapphire wedge with a thickness of 4 mm over a wavelength range from 1.5 µm to 4 µm.

In particular with broad-band infrared lasers (with an emission around the central wavelength in a range of at least 50 wave numbers, more preferably at least 500 wave numbers and even more preferably at least 1000 wave numbers) the GVD must be compensated, in order to be able to generate ultra-short pulses (i.e. pulses smaller than 500 fs). As is shown in FIGS. 3-5, it is possible to adjust arbitrary (negative and positive) GVDs for an infrared light pulse in the range around 3000 nm (2000 nm to 5000 nm), for example with a combination of ZnSe (FIG. 3, positive GVD parameter) and sapphire wedge thicknesses (FIG. 5 negative GVD parameter). The positions of the wedges 11, 12 and hence the (optical) thicknesses for the radiation 17 passing through the wedges 11, 12 are defined with reference to the materials used and to the wavelengths of the infrared laser. The use of two wedges 11, 12 leads to a beam offset Δy, which in the case of two resonator surfaces arranged parallel to each other, however, is unproblematic. In FIGS. 3-5, there was each used a wedge with a wedge angle of 7° and a thickness of 4 mm (based on the beam 17).

For wavelength ranges of 5000 nm to 9000 nm preferably the materials germanium, silicon and $CaF_2$ (up to 11000 nm $BaF_2$) are used.

The mechanism for holding and shifting the wedge plates can be formed by conventional devices (e.g. step motors etc.). Preferably, both wedges 11, 12 are continuously shifted relative to each other at the same time. The infrared beam diameter preferably can be up to 12 mm.

Figure 2:
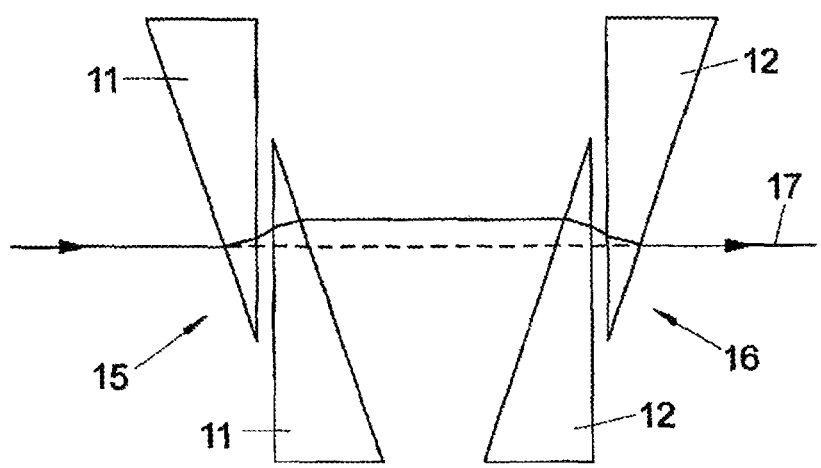
FIG. 2 shows a pulse shaper of the invention for an infrared laser in accordance with a second preferred embodiment in a schematic, sectional representation.

FIG. 2 shows another pulse shaper of the invention for a laser in a schematic, sectional representation. This pulse shaper consists of two pairs 15, 16 of dispersive elements, which each include two oppositely oriented wedges 11, 12. The materials of the individual wedge pairs have a different optical dispersion, although this is not absolutely necessary. By shifting the wedges 11, 12 of one wedge pair 15, 16 each in opposite directions (for example along the inner side faces), the (optical) thickness of the wedge pairs 15, 16 can be adjusted differently for an electromagnetic wave 17. Advantageously, the beam offset (Δy in FIG. 1) is compensated or almost compensated, so that this pulse shaper can be used in a larger number of cavities (e.g. ring cavity). In FIG. 2, the direction of the electromagnetic wave 17 is illustrated by arrows—but it is quite obvious that the electromagnetic radiation 17 in a resonator with two resonators surfaces arranged parallel to each other (front facet and rear facet) extends in both directions.

In accordance with another preferred variant, one of the wedge pairs 15, 16 is tilted such that the radiation of the other wedge pair perpendicularly impinges on the first surface of the wedge pair, whereby the beam offset can be minimized further.

With the pulse shaper of the invention, the intensities and pulse durations of light pulses can be increased or lowered with little energy losses, e.g. for amplifying light pulses (pre-chirp) or also for dissociating molecules (upchirp or downchirp).

FIGS. 6A-C and 7 refer to a pulse shaper 1 in accordance with another embodiment of the invention, wherein FIG. 6A shows a sectional view, FIG. 6B shows a side view and FIG. 6C shows a front view of the pulse shaper. FIG. 7 shows a perspective representation of the pulse shaper.

The pulse shaper 1 includes a first dispersive element in the form of a first wedge 11 of a first dispersive material and a second dispersive element in the form of a second wedge 12 of a second dispersive material, wherein the wedges 11, 12 each are arranged in a carriage 111, 121 such that planar side faces 114, 115 of the wedges face each other and are aligned parallel to each other.

The carriages 111, 121 each are movably mounted in a first (lower) linear guide 112a, 122a and in a second (upper) linear guide 112b, 122b, wherein the lower linear guides 112a, 122a are arranged on a base plate 113 of a frame of the pulse shaper and the upper linear guides 112b, 122b are arranged on an upper surface of the frame spaced from the base plate 113. The linear guides 112a, 112b in which the first carriage 111 is mounted extend parallel to the linear guides 122a, 122b in which the second carriage 121 is mounted, so that the two carriages 111, 121 can be shifted parallel to each other.

In addition, the carriages 111, 121 each include openings (windows) 1111, 1121 which provide for radiating through the wedges 11, 12 in particular in a direction transverse to the direction of movement of the carriages 111, 121.

The pulse shaper 1 in addition comprises an adjusting device 3, by means of which the two carriages 111, 121 can simultaneously be moved in opposite directions. The adjusting device 3 comprises an actuating element in the form of a drive rod 31 which at an upper end protruding from the frame of the pulse shaper includes a knurled handle 32, by means of which it can be manually rotated. Instead of a manual drive, the drive rod can of course also be rotated by motor, e.g. via an electric step motor.

The drive rod 31 includes a gear rim 33 which engages in toothed racks 34a, 34b which are arranged on the first and on the second carriage 111, 121, respectively. Rotating the drive rod 31 thus generates a simultaneous displacement of the carriages 111, 121 in opposite directions.

From the perspective view of the pulse shaper shown in FIG. 7 it can be taken that on the base plate 113 a connecting element in the form of a fastening rod 5 is mounted, by which the pulse shaper can be fixed e.g. to a laboratory table. For this purpose, the base plate includes e.g. a threaded hole. The pulse shaper can of course also include other fastening means for connection with an optical assembly, e.g. latching elements.

The invention claimed is:

1. A pulse shaper for compensating group runtime effects, comprising: a first and a second dispersive element, wherein:
an optical pulse can be coupled to the pulse shaper along a coupling direction such that said pulse exits from the pulse shaper after passing through the first and the second dispersive element along an exit direction;
the first and the second dispersive element are formed and arranged to be movable relative to each other such that the path length to be traversed by the optical pulse through the first and the second dispersive element after coupling to the pulse shaper can be adjusted without any change in an offset between the coupling direction and the exit direction; and
the first and the second dispersive element are arranged in such a way that the shape of the optical pulse experiences a change as the pulse travels through the pulse shaper, which primarily or exclusively is caused by the group velocity dispersion occurring during passage through the first and/or the second dispersive element, and wherein at least half of the change of the temporal half width of the optical pulse is caused by the group velocity dispersion and less than half of the change of the temporal half width is caused by runtime effects during passage through a space between the first and the second dispersive element.

2. The pulse shaper according to claim 1, wherein the first and the second dispersive element each are formed in the shape of a wedge.

3. The pulse shaper according to claim 1, wherein the first and/or the second dispersive element each are formed with two planar side faces, which converge at an acute angle.

4. The pulse shaper according to claim 1, wherein the first dispersive element includes a first dispersive material and the second dispersive element includes a second dispersive material, wherein the optical dispersion of the first material corresponds to the optical dispersion of the second material.

5. The pulse shaper according to claim 1, wherein the first dispersive element includes a first dispersive material and the second dispersive element includes a second dispersive material, wherein the optical dispersion of the first material differs from the optical dispersion of the second material.

6. The pulse shaper according to claim 1, wherein the first and/or the second dispersive element includes a positively dispersive material.

7. The pulse shaper according to claim 1, wherein the first and/or the second dispersive element includes a negatively dispersive material.

8. The pulse shaper according to claim 1, wherein the first and the second dispersive element are arranged with such a small distance to each other that after passing through the first and the second dispersive element different wavelength components of the optical pulse have a spatial offset relative to each other, which is smaller than the spatial diameter of the optical pulse.

9. The pulse shaper according to claim 1, wherein the greatest distance between the first and the second dispersive element is not more than 20 cm, in particular not more than 30 mm.

10. The pulse shaper according to claim 1, wherein the first and the second dispersive element are arranged on a common holder and/or in a common frame.

11. The pulse shaper according to claim 1, further comprising an adjusting device by means of which the first and/or the second element can be moved, wherein the first and the second dispersive element simultaneously can be moved in opposite directions by means of the adjusting device.

12. The pulse shaper according to claim 1, wherein the first and the second dispersive element are movably mounted in linear guides parallel to each other.

13. The pulse shaper according to claim 1, wherein the dispersive elements are mounted to be steplessly movable relative to each other.

14. The pulse shaper according to claim 1, wherein the dispersive elements are mounted such that side faces of the dispersive elements facing each other always are aligned parallel to each other and/or the distance between the side faces of the dispersive elements facing each other is smaller than 5 mm.

15. The pulse shaper according to claim 1, wherein the dispersive elements include a material selected from the group including sapphire, ZnSe, ZnS, Ge, Si, CaF2, BaF2, LiF, MgF, KRS-5, GaAs, KBr, KCl, NaCl, TiO2, CdTe, GeAsSe, AsSeTe, diamond, MgO, SiO2, metamaterials and Irtran.

16. The pulse shaper according to claim 1, wherein the first and the second dispersive element form a first pair and the pulse shaper in addition includes a second pair of dispersive elements.

17. The pulse shaper according to claim 16, wherein the optical dispersion of the material of the dispersive elements of one of the pairs each is the same, but the optical dispersion of the material of the dispersive elements of the first pair differs from the optical dispersion of the material of the dispersive elements of the second pair.

18. A laser, in particular an infrared laser, including an active medium and a resonator, wherein a pulse shaper according to claim 1 is arranged inside the resonator.

19. The laser according to claim 18, wherein the first and the second dispersive element of the pulse shaper form a first pair and the pulse shaper in addition includes a second pair of dispersive elements, and wherein the dispersive elements of both pairs are arranged such that side faces each facing the other dispersive element of a pair are arranged parallel to a front facet and a rear facet of the resonator.

20. An optical parametric amplifier or optical parametric oscillator, including a non-linear crystal, a pump beam, a seed beam and a generated beam, wherein a pulse shaper according to claim 1 is arranged in the beam path of the pump beam, of the seed beam or of the generated beam.

* * * * *